(12) United States Patent
Viola

(10) Patent No.: US 11,880,832 B2
(45) Date of Patent: Jan. 23, 2024

(54) METHOD AND SYSTEM FOR ENHANCING THE SECURITY OF A TRANSACTION

(71) Applicant: GEMALTO SA, Meudon (FR)

(72) Inventor: Francesco Viola, Meudon (FR)

(73) Assignee: THALES DIS FRANCE SAS, Meudon (FR)

(*) Notice: Subject to any disclaimer, the term of this patent is extended or adjusted under 35 U.S.C. 154(b) by 0 days.

(21) Appl. No.: 16/064,462

(22) PCT Filed: Dec. 21, 2016

(86) PCT No.: PCT/EP2016/082208
§ 371 (c)(1),
(2) Date: Jun. 21, 2018

(87) PCT Pub. No.: WO2017/108970
PCT Pub. Date: Jun. 29, 2017

(65) Prior Publication Data
US 2019/0005493 A1    Jan. 3, 2019

(30) Foreign Application Priority Data

Dec. 24, 2015 (EP) ..................................... 15307142

(51) Int. Cl.
*G06Q 20/38* (2012.01)
*H04W 12/04* (2021.01)
(Continued)

(52) U.S. Cl.
CPC ......... *G06Q 20/3829* (2013.01); *G06F 21/14* (2013.01); *G06Q 20/326* (2020.05);
(Continued)

(58) Field of Classification Search
CPC ............... G06Q 20/3829; G06Q 20/32; G06Q 20/3823; H04W 12/0608; G06F 21/14
See application file for complete search history.

(56) References Cited

U.S. PATENT DOCUMENTS 4,529,870 A * 7/1985 Chaum .................. G06K 19/07
235/379
4,614,861 A * 9/1986 Pavlov .................. G07F 7/1083
235/380
(Continued)

FOREIGN PATENT DOCUMENTS

CA    2370604 A1 * 3/2001 ............. G06Q 10/02
EP    1672554 A1    6/2006
(Continued)

OTHER PUBLICATIONS

PCT/EP2016/082208, International Search Report, dated Feb. 21, 2017, European Patent Office, P.B. 5818 Patentlaan 2 NL—2280 HV Rijswijk.
(Continued)

*Primary Examiner* — Jacob C. Coppola
*Assistant Examiner* — Terry Nathan Murray

(57) ABSTRACT

This invention concerns a method and system for improving the security of transaction in an emulated Integrated Circuit. Methods and devices for pre-generating session keys for securing transactions are provided. The generated session key is obfuscated with a preventing data for unauthorized use and/or access of the session cryptographic and encrypted. This encrypted obfuscated key is provisioned from a remote computer to the communication device. The mobile application is configured to decrypt and de-obfuscate the received encrypted obfuscated session cryptographic key, during a transaction. The method may also include generating, by the communication device, a transaction cryptogram using the decrypted and de-obfuscated session cryptographic key, and sending by the communication device to the remote system the transaction cryptogram to conduct the transaction. The transaction can be authorized based on at least whether the decrypted and de-obfuscated session cryptographic key is the expected one. With the
(Continued)

invention, the session cryptographic key is keep unveiled from the moment they are provisioned to until the very last moment when the session cryptographic key is used to compute the cryptogram.

25 Claims, 3 Drawing Sheets

(51) Int. Cl.

| | | |
|---|---|---|
| G06F 21/14 | (2013.01) | |
| H04L 61/00 | (2022.01) | |
| H04L 41/0273 | (2022.01) | |
| H04W 12/40 | (2021.01) | |
| H04W 12/041 | (2021.01) | |
| H04W 12/48 | (2021.01) | |
| H04W 12/60 | (2021.01) | |
| H04W 12/06 | (2021.01) | |
| G06Q 20/32 | (2012.01) | |
| H04L 9/08 | (2006.01) | |
| H04W 88/02 | (2009.01) | |

(52) U.S. Cl.
CPC ......... *G06Q 20/3823* (2013.01); *H04L 9/088* (2013.01); *H04L 9/0822* (2013.01); *H04L 41/0293* (2013.01); *H04L 61/00* (2013.01); *H04W 12/04* (2013.01); *H04W 12/041* (2021.01); *H04W 12/068* (2021.01); *H04W 12/40* (2021.01); *H04W 12/48* (2021.01); *H04W 12/60* (2021.01); *H04L 2463/062* (2013.01); *H04W 88/02* (2013.01)

(56) References Cited

U.S. PATENT DOCUMENTS

| | | | | |
|---|---|---|---|---|
| 2002/0184217 | A1* | 12/2002 | Bisbee | ............... G06F 21/33 |
| 2004/0117262 | A1 | 6/2004 | Berger | |
| 2005/0149722 | A1* | 7/2005 | Wiseman | ............ H04L 63/061 |
| | | | | 713/155 |
| 2010/0036777 | A1 | 2/2010 | Arceneaux | |
| 2011/0191244 | A1* | 8/2011 | Dai | ..................... G06Q 20/40 |
| | | | | 705/44 |
| 2012/0041879 | A1* | 2/2012 | Kim | ..................... G06Q 20/40 |
| | | | | 705/44 |
| 2014/0040149 | A1 | 2/2014 | Fiske | |
| 2014/0281477 | A1* | 9/2014 | Nayshtut | ............... H04L 9/0825 |
| | | | | 713/150 |
| 2014/0333416 | A1* | 11/2014 | Eichholz | ................. G06F 21/35 |
| | | | | 340/5.86 |
| 2015/0019442 | A1* | 1/2015 | Hird | ..................... H04L 63/062 |
| | | | | 705/71 |
| 2015/0178724 | A1* | 6/2015 | Ngo | ..................... G06Q 20/32 |
| | | | | 705/71 |
| 2015/0248668 | A1* | 9/2015 | Radu | ................... G06Q 20/322 |
| | | | | 705/71 |
| 2015/0339664 | A1* | 11/2015 | Wong | ................ G06Q 20/3829 |
| | | | | 705/71 |
| 2016/0140545 | A1* | 5/2016 | Flurscheim | ........ G06Q 20/3821 |
| | | | | 705/76 |
| 2017/0006469 | A1* | 1/2017 | Palanigounder | ...... H04L 63/067 |

FOREIGN PATENT DOCUMENTS

| | | |
|---|---|---|
| EP | 2151795 A1 | 2/2010 |
| WO | WO9704394 A1 | 2/1997 |
| WO | WO2015042548 A1 | 3/2015 |
| WO | WO2015179637 A1 | 11/2015 |

OTHER PUBLICATIONS

PCT/EP2016/082208, Written Opinion of the International Searching Authority, dated Feb. 21, 2017, European Patent Office, D-80298 Munich.
PCT/EP2016/082209, International Search Report, dated Feb. 28, 2017, European Patent Office, P.B. 5818 Patentlaan 2 NL—2280 HV Rijswijk.
PCT/EP2016/082215, International Search Report, dated Feb. 7, 2017, European Patent Office, P.B. 5818 Patentlaan 2 NL—2280 HV Rijswijk.
Clarksville Rd: "Smart Card Alliance A Smart Card Alliance Mobile & NFC Council White Paper", Aug. 1, 2014, XP055171894, Retrieved from the internet: URL:http://www.smartcardalliance.org/wp-content/uploads/HCE-101-WP-FINAL-081114-clean.pdf [retrieved on Feb. 25, 2015] pp. 12-15, p. 19.

\* cited by examiner

METHOD AND SYSTEM FOR ENHANCING THE SECURITY OF A TRANSACTION

TECHNICAL FIELD

The present invention relates generally to the field of payment and authorization methods. More particularly this disclosure relates to using a computing device that does not have or does not rely on a secure element to make payments, authorizations or exchange information with other devices.

Particularly, the present invention relates to a method and system for improving the security of transaction in an emulated Integrated Circuit (ICC).

BACKGROUND ART

Advances in the capabilities of communication devices have allowed communication devices such as smart phones to be used as payment instruments to conduct contactless transactions. For example, a communication device can be placed in proximity to an access device such as a point-of-sale (POS) terminal to transfer account information from the communication device to the access device to conduct a transaction.

To provide a secure operating environment to securely store account information on a communication device, secure elements such as SIM cards, micro-SD cards or mobile phone embedded chips have been looked at for some time as the right place to securely store the most sensitive part of mobile applications of the service providers.

Indeed, the secure element is considered secure because account information, keys and secret data are stored in tamper-resistant hardware, which protects this information from malware or viruses that may have infected the operating system or an application running on the communication device.

Today, there are new emerging technologies, some of them relying on new security paradigms, different from traditional secure storage. In the current state of the art there is technology that make possible to "emulate" a smart card by software and to use it in the context of contactless transactions, using the so called "Host Card Emulation" (HCE) technology, so it is possible to perform NFC payments by using such a software smart card emulation in a communication device.

However, because a secure element is not used, transaction security is a concern. Indeed, the keys and sensitive data are stored in the communication device. While a secure element is practically inaccessible, the communication device defenses can be easily defeated and allow a malicious individual to access a specific application to understand how the communications device operates and thereby have a way to steal keys and sensitive data.

Keys are used to compute cryptograms (which is used to verify the validity of transactions). The keys used to compute cryptograms are among the most sensitive assets of the transaction. Once a key is stolen, anyone can actually use the key to perform transactions because the operations to compute the cryptogram are well known. Therefore, the stolen key can be used in any other equivalent system.

One known solution to improve security for contactless transactions has been introduced by the EMV tokenization specification. In this specification, a transaction using the communication device includes receiving, from a remote computer, a limited-use key that is associated with a set of one or more limited-use thresholds that limits usage of the limited-use key. The specification proposes means for generating, by the communication device, a transaction cryptogram using the limited-use key, and sending, by the communication device to an issuer, a token instead of a real account identifier and the transaction cryptogram to conduct the transaction. The transaction is authorized based on at least whether usage of the limited-use key has exceeded the set of one or more limited-use thresholds. A dedicated server is used to replenish keys once they have completed their life cycle.

As the limited use keys are transported from one point to another (from the remote compute/server to the communication device) and if the channel is not secure enough, the keys can be stolen.

Moreover, as the incentive for an attacker to profit from the stored data increases, attacks to gain access to secret data (keys, credentials . . . ) into the software smart card will become more severe.

Moreover, despite the endless attempts to prevent software hacking, information stored on the communication device and communicated from the communication device to a merchant point of sale ("POS") device or a remote computer is vulnerable to security attacks. Accordingly, it may not be safe to store the keys on unsecured communication devices.

Embodiments of the present invention address these and other problems individually and collectively. Specifically, embodiments of the invention address the problem of security concerns with conducting payment transactions with a software smart card emulation into a communication device.

Accordingly, it is an object of the present invention to provide a method for improving the security of keys used to compute transaction cryptograms.

SUMMARY OF THE INVENTION

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The present invention addresses the aforementioned security drawbacks of transactions with software smart card emulation in a communication device. The present invention provides techniques for enhancing the security of a communication device when conducting a transaction using the communication device.

This object is achieved through a method directed to generating and securing an account parameters (keys, credentials . . . ) that may have a limited lifespan, and once expired, may no longer be used to conduct a transaction until the account parameters are replenished from the cloud (e.g., a remote computer).

In an embodiment, a master key associated to a mobile application of the communication device is held by a trusted authority, such as the issuing bank. The trusted authority is adapted to generate a protected session keys for unauthorized use/access on the basis of the master key and distribute protected session keys to the mobile application. Receipt of the protected session key by the mobile application enables the mobile application to retrieve the session key and conduct an EMV payment transaction. The session key is used for the authorization of the EMV payment transaction.

In an embodiment, the method of the present invention proposes to generate at least one session cryptographic key from the master key. The method includes a protection algorithm of the session cryptographic key for enhancing the security of a communication device when conducting a transaction using the mobile application of the communication device. The method includes generating a cryptogram based on the protected session cryptographic key, transmitting the cryptogram to a third party for verification and validation. The verification and validation of the cryptogram will be unsuccessful when unauthorized access/use of the session cryptographic key is detected.

In an embodiment, the method may include the step of deleting the session cryptographic key from the communication device after generating the cryptogram.

In an embodiment, the session cryptographic key may be associated with a set of one or more limited-use thresholds that limits usage of the session cryptographic key.

The present invention proposes a method to protect the session cryptographic key to ensure that this sensitive data cannot be intercepted during a transaction. For that, in an embodiment, the session cryptographic key may be obfuscated with binding data related to an unauthorized use/access of the session cryptographic key. The binding data may be related to the user, the communication device, the mobile application, the location of the user, the transaction, etc.

The obfuscated session cryptographic key may be encrypted and provisioned from the remote computer to the communication device. The mobile application is configured to decrypt and de-obfuscate the received encrypted obfuscated session cryptographic key, during a transaction. The method may also include generating, by the communication device, a transaction cryptogram using the decrypted and de-obfuscated session cryptographic key, and sending by the communication device to an access device the transaction cryptogram to conduct the transaction. The transaction can be authorized based on at least whether the decrypted and deobfuscated session cryptographic key is the expected one.

An advantage of the present invention is to keep the session cryptographic key protected and hidden from the moment it is generated and provisioned to the communication device by the remote computer until the very last moment when the session cryptographic key is actually used to compute the cryptogram by the communication device. If lifted, the use of the session cryptographic key in another system results in a failure on the back-end means during the verification and validation phase.

In an embodiment, the generated session cryptographic key may be obfuscated with data related to the user. This obfuscation allows to bond the session cryptographic key with the user for preventing unauthorized access/use of the session cryptographic key. The session cryptographic key can only be used by the given user. The user binding data may be a PIN, an identifier, a fingerprint or any other biometric information, or any data related to the user.

In an embodiment, the generated session cryptographic key may be obfuscated with data related to the communication device. This obfuscation allows to bond the session cryptographic key with the communication device for preventing unauthorized access/use of the session cryptographic key. The session cryptographic key can only be used into the given communication device. The binding data of the communication device may be a specific and unique characteristic of the communication device such a unique identifier, an identifier of the CPU, an output of a Physical Unclonable Function (PUF) implemented into the device communication, sensors identifiers, etc. . . .

In an embodiment, the generated session cryptographic key may be obfuscated with data related to the mobile application. This obfuscation allows to bond the session cryptographic key with the mobile application for preventing unauthorized access/use of the session cryptographic key by another application. The session cryptographic key can only be used into the given application. The application binding data may be an identifier of the application, a signature of a certificate used to sign the application, a hash of at least one part of the application, etc. . . .

In an embodiment, the generated session cryptographic key may be obfuscated with data related to the limited-use thresholds (sequence/history/life cycle) that limits usage of the session cryptographic key. This obfuscation allows to bond the session cryptographic key with the limited-use thresholds (sequence/history/life cycle). The session cryptographic key can only be used during in a predetermined instant of time and sequence. The limited-use thresholds binding data may be a sequence counter value, a time stamp, key material extracted from previous keys, etc. . . .

Of course, these examples of binding data are merely examples, and other binding data can be employed for preventing unauthorized access/use of the session cryptographic key with geographic data, date, time, location, etc. . . .

In an embodiment, at least one binding data may be used to obfuscate the session cryptographic key to generate an obfuscated key. The obfuscated key may be encrypted with a transport key generated by the remote computer. The transport key may be encrypted with a static key generated by the remote computer. The mobile application into the communication device is configured to retrieve the static key.

During provisioning phase, instead of provisioning the session cryptographic key to the communication device, the encrypted obfuscated session cryptographic key is sent along with the encrypted transport key.

During transaction, in one embodiment, a decryption, de-obfuscation/unbinding operations of the encrypted obfuscated session cryptographic key may be performed during the computation of the cryptogram. These operations may be virtually undistinguishable from the cryptogram computation. With the present invention, an attacker would not be able to get the session cryptographic key with only the application and/or the software smart card emulation and the undistinguishable decryption, de-obfuscation/unbinding operations from the cryptogram computation. This will make static and dynamic analysis quite difficult and time consuming for an attacker.

With the present invention, no stop condition is inserted into the application when one of the binding data is wrong and the session cryptographic key is wrongly retrieved. Instead, the execution of the application continues to silently corrupt the computation of the cryptogram, therefore, the malicious individual is unable to understand why and when the generation of the cryptogram is failing.

To achieve those and other advantages, and in accordance with the purpose of the invention as embodied and broadly described, the invention proposes a method for enhancing security of a communication device when conducting a transaction using a transaction application of the communication device, the method comprising:

a remote system being operated to generate at least one session cryptographic key, said session cryptographic key being bound to a specific context defined with preventing data for unauthorized use and/or access of the session cryptographic key so that any change in the specific context will corrupt the session cryptographic key during the unbinding phase;

the remote system being operated to send the generated binding session cryptographic key to the communication device, during computation of a transaction cryptogram, the communication device being operated to:

determine the preventing data for unauthorized use and/or access of the session cryptographic key and to unbind the session cryptographic key to the specific context with the determined preventing data;

compute the transaction cryptogram using the unbind session cryptographic key, wherein the transaction is authorized based on at least whether the computed transaction cryptogram is the expected one and the unbind session cryptographic key is not corrupted. If the unbind session cryptographic key is corrupted, the cryptogram will be wrongly computed, the transaction will be rejected at the remote computer side.

The present invention proposes a method for enhancing security of a communication device when conducting a transaction using a transaction application of the communication device, the method comprising:

a remote system being operated to generate at least one session cryptographic key, said session cryptographic key being obfuscated with a preventing data for unauthorized use and/or access of the session cryptographic key, the remote system being operated to send the generated obfuscated session cryptographic key to the communication device, during computation of a transaction cryptogram, the communication device being operated to:

determine the preventing data for unauthorized use and/or access of the session cryptographic key and to de-obfuscate the session cryptographic key with the determined preventing data;

compute the transaction cryptogram using the de-obfuscate session cryptographic key, wherein the transaction is authorized based on at least whether the preventing data for unauthorized use and/or access of the session cryptographic key is the expected one.

According to an embodiment of the present invention, the obfuscation of the session cryptographic key comprises the following steps:

the remote system being operated to generate a transport key, the obfuscated session cryptographic key being encrypted with said transport key, the remote system being operated to encrypt the transport key with a generated static key, said static key being retrievable by the communication device, the remote system being operated to transmit to the communication device the encrypted obfuscated session cryptographic key along with the encrypted transport key during a provisioning or replenishment phase of the encrypted obfuscated session cryptographic key.

According to an embodiment of the present invention, the de-obfuscation of the session cryptographic key comprises the following steps:

during the computation of the transaction cryptogram, the communication device being operated to retrieve the static key and to decrypt the encrypted transport key, the communication device being operated to decrypt the encrypted obfuscated session cryptographic key with the decrypted transport key.

According to an embodiment of the present invention, the retrieve of the static key comprises the following step:

the communication device is operated to extract the static key stored as hard coded text into the transaction application code or stored into a secure memory, or the communication device is operated to generate the static key from a master key stored as hard coded text into the transaction application code or stored into a secure memory.

According to an embodiment of the present invention, the session cryptographic key is associated with a set of one or more limited-use thresholds that limit usage of the session cryptographic key.

According to an embodiment of the present invention, the set of one or more limited-use thresholds may include at least one of a time-to-live indicating the duration of time for which the session cryptographic key is valid, a predetermined number of transactions for which the session cryptographic key is valid, and/or a cumulative transaction amount indicating the total transaction amount summed across one or more transactions for which the session cryptographic key is valid.

According to an embodiment of the present invention, the preventing data for unauthorized use and/or access of the session cryptographic key is data binding the session cryptographic key with data related to the user, the mobile application, the communication device and/or the limited-use thresholds.

According to an embodiment of the present invention, after the generation of the transaction cryptogram, the communication device deletes the session cryptographic key.

The present invention also relates to a communication device comprising:

a processor; and a memory coupled to the processor and storing a transaction application that performs operations for enhancing security of the communication device when conducting transaction using the communication device according to any of the previous claims.

The present invention also relates to a transaction application for enhancing security of a communication device when conducting transaction using the communication device, according to any previous claims, wherein the transaction application comprising a processing unit comprising a provisioning service configured to establish a communication with the remote system during a provisioning or replenishment phase of session cryptographic key bind to a specific context defined with a preventing data for unauthorized use and/or access of the session cryptographic key so that any change in the specific context will corrupt the session cryptographic key during unbinding phase, the transaction application comprising a controlling unit, the controlling unit comprising a security module, the processing unit being operated to transmit to the security module of the controlling unit, the session cryptographic key bind to the specific context;

during computation of a transaction cryptogram, the security module being configured to:

retrieve a preventing data for unauthorized use and/or access of the session cryptographic key and to unbind the session cryptographic key to the specific context with the retrieved preventing data;

compute a cryptogram from the unbind session cryptographic key, wherein the transaction is authorized based on at least whether the computed transaction cryptogram is the expected one and the unbinding session cryptographic key is not corrupted. According to an embodiment of the present invention, the security module is a white box cryptography or a Trusted Execution Environment.

According to an embodiment of the present invention, the processing unit and the controlling unit are in the form of a software developer kit integrated into the transaction application.

According to an embodiment of the present invention, the processing unit is implemented in platform independent code and the controlling unit is implemented in native code.

According to an embodiment of the present invention, the platform independent code is Java.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

The following detailed description will be better understood with the drawings, in which.

DETAILED DESCRIPTION OF THE EMBODIMENTS OF THE INVENTION

Figure 1:
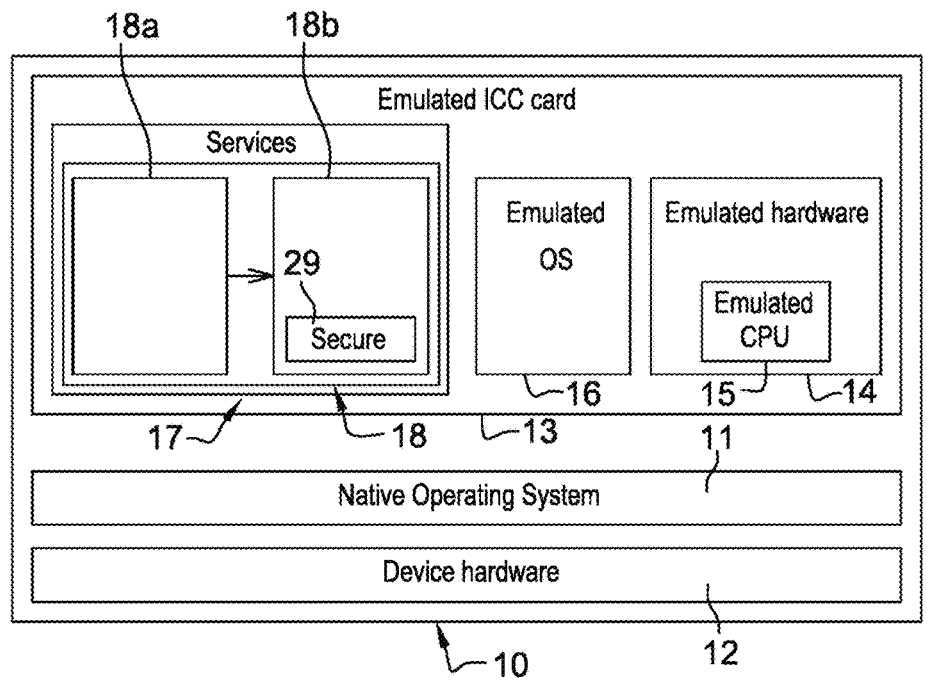
FIG. 1 illustrates the different entities in a communication device involved in a transaction.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation.

The present invention is not specific to any particular hardware or software implementation and is at a conceptual level above specifics of implementation. It is to be understood that various other embodiments and variations of the invention may be produced without departing from the spirit or scope of the invention. The following is provided to assist in understanding the practical implementation of particular embodiments of the invention.

The same elements have been designated with the same referenced numerals in the different drawings. For clarity, only those elements and steps which are useful to the understanding of the present invention have been shown in the drawings and will be described.

Further, the mechanisms of data communication between the parties and their environment have not been detailed either, the present invention being here again compatible with usual mechanisms.

Furthermore, the connecting lines shown in the various figures contained herein are intended to represent exemplary functional relationships and/or physical couplings between the various elements. It should be noted that many alternatives or additional functional relationships or physical connections may be present in a practical system. Furthermore, the various entities in FIG. 1 to FIG. 4 may communicate via any suitable communication medium (including the Internet), using any suitable communication protocol.

Many electronic payment systems use the EMV (Europay®, Mastercard®, Visa®) transaction protocols, as defined for example in the EMV Specifications or the EMV Contactless Specifications for Payment Systems, which are publicly available and published by EMVCo LLC. These protocols are referred to herein as simply "EMV".

Described herein in various implementations are systems and methods for providing secure communication, secure data transfer and storage, authentication and transaction authorization which can be performed through a communication device with or without a secure element. Embodiments of the present invention provide techniques for enhancing the security of the communication device when conducting a transaction using the communication device without involving a secure element. The techniques described herein can be used with a communication device that may or may not have a secure element, because the techniques do not require the use of a secure element. However, a secure element could be present.

In the example implementations described hereinafter, the present invention provide techniques for enhancing the security of the communication device when conducting a transaction using the communication device by using an emulated Integrated Circuit Card ICC also called emulated ICC card.

In a non-limitative embodiment, the emulated integrated circuit card ICC is an emulated smart card. In a non-limitative example, the emulated smart card is an emulated banking card, such as an emulated EMV card.

Emulation refers to the use of a computer program or hardware to provide (i.e., emulate) the functionality of other software or hardware. An emulator can include modules that correspond to hardware components of an emulated device. For example, an emulator can provide emulation of a central processing unit (CPU), memory subsystem, and input/output devices. In the case of emulation by a software-based emulator, an operating system and other applications can be interpreted by the emulator, rather than being run by native hardware. A software-based emulator can also emulate a particular hardware architecture than the architecture of a host device on which the emulator executes.

For example, in the embodiment described herein, an emulator is configured to emulate the integrated circuit (e.g., a CPU) that has a different instruction set than a physical integrated circuit of the host device. The emulated integrated circuit card can duplicate the instruction cycle and instruction cycle timing of the physical integrated circuit.

The emulated ICC card can include emulated hardware, operating systems, software modules, applications, plugins, runtime environments, graphics engines, input/output methods, drivers, abstraction layers, clients, connection protocols, security protocols, storage, memory, and virtualized peripherals. Further, the emulated ICC card can select different CPU instruction sets for operations that can be different from the instruction set used by the CPU of the host device.

The emulated ICC card can execute on an operating system (OS) of a host device and can enable device-based authentication/authorization services for mobile and electronic commerce merchants and service providers.

For example, the emulated ICC card can provide transaction authorization request through a mobile application and cloud-based web services in a secure manner. In other instances, the emulated ICC card enables the secure storage, exchange, and transmission of information to and from various forms of mobile and non-mobile devices, instruments, computers, and other systems.

Further, various devices, systems, programs, instruments, and equipment can be emulated using the techniques described herein, such as, kiosks, workstations, handheld devices for point of sale systems, banking devices, automated teller machines, retail and payment systems, healthcare devices, defense and government equipment, voting and data collection devices, and other data storage and transmission devices.

Prior to discussing the details of some embodiments of the present invention, description of some terms may be helpful in understanding the various embodiments.

An "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "issuer" may typically refer to a business entity (e.g., a bank) that maintains an account for a user that is associated with a communication device such as an account enrolled in the mobile application 18 installed on the communication device 10. An issuer may also issue account parameters associated with the account to a communication device. An issuer may be associated with a host system that performs some or all of the functions of the issuer on behalf of the issuer.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "limited-use threshold" may refer to a condition that limits the usage of a piece of information. A limited-use threshold may be exceeded or exhausted when the underlying condition is met. For example, a limited-use threshold may include a time-to-live limitation that indicates an amount of time for which a piece of information is valid, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction, such as the cryptogram.

The authorization request message may also include other information such as information that identifies the access device that generated the authorization request message, information about the location of the access device, etc.

In the following description:
"source code" refers to programming code that is a platform independent code. The source code is interoperable as it may be run without being modified on any kind of devices such as an integrated circuit card ICC which supports a virtual machine VM. It is written in a portable language and run by a virtual machine. Once compiled, the source code generates virtual machine instructions;

"virtual machine instructions" refers to programming code that is run through a virtual machine instead of a processing unit, such as the processing unit of the ICC. Such programming code is a platform-independent code. Said virtual machine instructions are issued from the compilation of source code;

a "virtual machine VM" is an interpreter which decodes and executes virtual machine instructions;

a "native function" refers to programming code which when compiled generates a native code;

"native code" (also called "machine language") refers to programming code that is configured to run on a particular type of processing unit. Native code will generally not run if used on a processor other than the one it was specifically written for. It is a platform-dependent code. In the example of the emulated integrated circuit card ICC, a native code is linked to the emulated processing unit of said emulated integrated circuit card;

an "operation" (also called a "functionality") refers to a functional process; and an "instruction" refers to a code instruction.

In non-limitative examples:
the source code may be written in Java, .NET or JavaCard™ or any existing platform independent language.
the native function may be written in the C language, assembler language or C++ language or any existing platform dependent language.

These non-limitative examples will be taken in the following description.

Some embodiments are described herein in the context of an EMV-compliant payment transaction at a merchant Point of Sale (POS) terminal using near field communications (NFC). However, it will be appreciated that the embodiments described herein may be used in connection with ATM transactions, unattended kiosk or vending machine transactions, e-commerce and other similar transactions. Moreover, there are many protocol variations on EMV for NFC transactions. The embodiments described herein may be employed with other protocols or standards.

Details of some embodiments of the present invention will now be described.

Referring to FIG. 1, in one implementation, a user communication device 10 comprises a native operating system 11 executing on a device hardware 12. The communication device 10 can be a mobile or other device, such as a smartphone, smart watch, smart glasses, tablet computer, desktop computer, portable computer, television, gaming device, music player, mobile telephone, laptop, palmtop, smart or dumb terminal, network computer, personal digital assistant, wireless device, information appliance, workstation, minicomputer, mainframe computer, or other computing device that can execute the functionality described herein.

The native operating system 11 can be a mobile, desktop, server, or other operating system such as an Apple iOS® platform, a Google Android™ platform, a Microsoft Windows® operating system, an Apple OS X® operating system, a Linux® operating system, a variant of a UNIX® operating system, and the like.

Device hardware 12 can include one or more processors suitable for the execution of a computer program, including both general and special purpose microprocessors. Generally, a processor receives instructions and data stored on a read-only memory or a random-access memory or both. Information carriers suitable for embodying computer program instructions and data include all forms of nonvolatile memory. One or more memories can store instructions that, when executed by a processor, form the modules and other components described herein and perform the functionality associated with the components. The processor and the memory can be supplemented by or incorporated in special purpose logic circuitry.

The communication device 10 can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

In one implementation, a software processing module of the communication device 10 comprises the emulated ICC card 13. The emulated ICC card can include emulated hardware 14 and emulated software, such as emulated operating system 16. Emulated hardware 14 can include one or more emulated processors, such as emulated central processing unit (CPU) 15, emulated memories and other storage mediums, emulated input and/or output devices, emulated communications ports and other interfaces, and so on. The emulated operating system 16 can be configured to communicate with the native operating system 11 through an emulated network interface of the emulated ICC card 13.

The emulated ICC card 13 can also comprise services container 17, in which one or more services can execute. The services 17 can include, but are not limited to, secure input/output, storage, key management, Quick Response Code (QRC) management, near field communication (NFC), mobile applications 18, Host Card Emulation and other security and storage services.

The mobile application 18 may be provided by a mobile application provider. For example, if the provider of mobile application 18 is an issuer, the mobile application 18 may be a mobile banking application or a separate mobile payment application. If the provider is a mobile wallet provider such as a mobile network operator or third-party wallet provider that supports multiple issuers, the mobile application 18 may be a mobile wallet application. For merchants, the mobile application 18 may be a merchant's own mobile application from which consumers can conduct e-commerce or point of sale transactions with that merchant, or may be a mobile wallet application that supports multiple merchants. The provider of the mobile application 18 can be others suitable entities.

In a non-limitative implementation, the card emulation technology (e.g., Host Card Emulation (HCE), etc.) allows to emulate a smartcard on the communication device 10 to allow the mobile application 18 running on the communication device to conduct transactions such as contactless transactions. In the card emulation environment, the mobile application 18 can access the contactless interface of the communication device 10 via the operating system (OS) 11 of the communication device 10.

Examples of contactless interfaces may include one or more radio frequency (RF) transceivers that can send and receive communications using near-field communications (NFC), or other radio frequency or wireless communication protocols such as Bluetooth, Bluetooth low-energy (BLE), Wi-Fi, iBeacon, etc. In some embodiments, contactless interfaces may include an optical interface (e.g., a display screen) to present payment information in the form of an image such as a quick response (QR) code, or bar code, etc. to a contactless device which includes an optical code scanner or reader.

In an embodiment, the mobile application 18 comprises a processing unit 18a and a controlling unit 18b. The processing unit 18a and the controlling unit 18b of the mobile application can be in the form of a software developer kit (SDK)) integrated into the mobile application to support the transaction functionalities. The processing unit 18a and the controlling unit 18b may perform functions to facilitate transactions such as to generate transaction cryptograms for transmission to a remote system 21.

The processing unit 18a and the controlling unit 18b may perform functions to facilitate transactions such as to decrypt and de-obfuscate the account parameters, generate transaction cryptograms, for transmission to a remote system 21. The processing unit 18a and the controlling unit 18b may also manage the initial service profile parameters (e.g., limited-use thresholds) that are provided after an account has been provisioned to ensure that requests for account parameter replenishment and other account parameter management activities are initiated.

In an embodiment, the controlling unit 18b may comprise a security module 29. The security module 29 may be implemented with a highest level of security.

In an embodiment, the security module 29 may comprise a White box cryptographic ("WB cryptographic") technology, which is a unique cryptographic technology that protects cryptographic algorithms so that operations the security module 29 can execute within a hostile environment without leaking a cryptographic key and other cryptographic values.

In another embodiment, the security module 29 may comprise a TEE (Trusted Execution Environment).

In a non-limitative example, the processing unit 18a of the mobile application 18 is implemented in independent platform code such as Java and the controlling unit 18b in native code.

Figure 2:
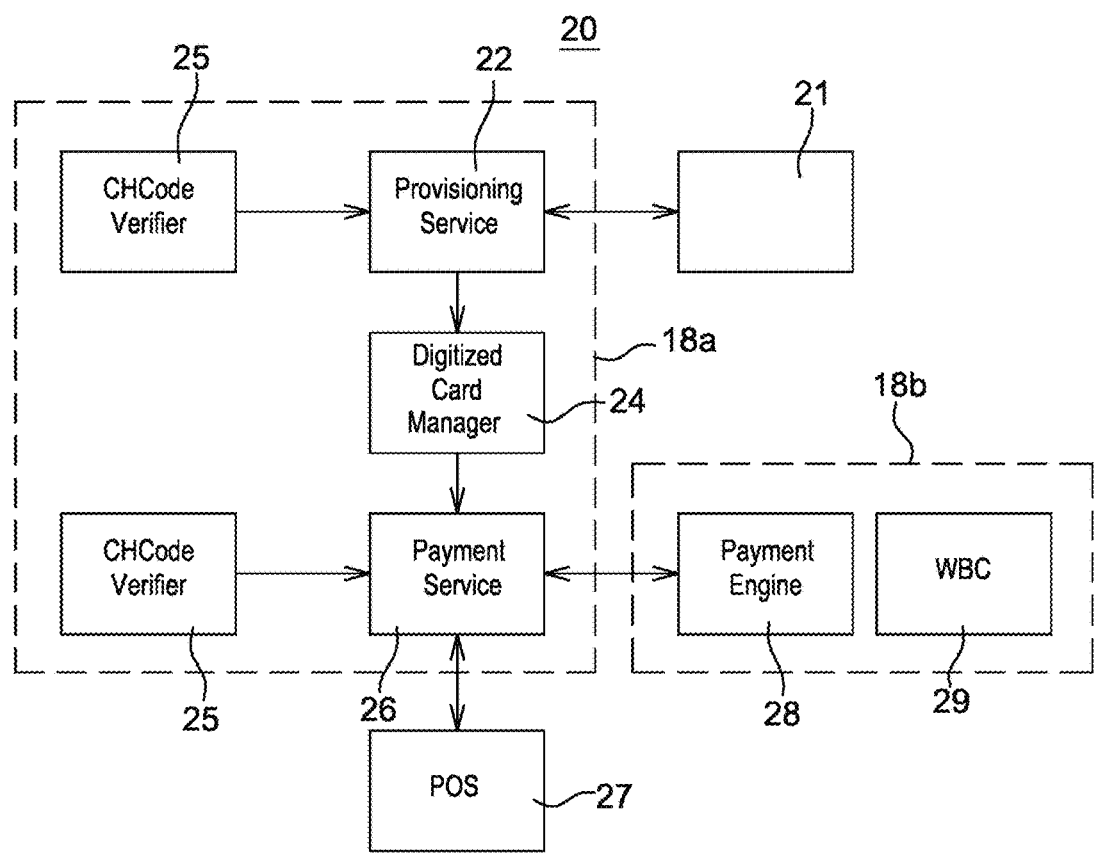
FIG. 2 illustrates an example implementation of different entities of a system involved in a transaction made using an emulated ICC Card.

An example of a transaction communication system 20 in which the various exemplary embodiments described herein can be implemented is now described with respect to FIG. 2. The components of system 20 may include the remote system 21 to manage transactions conducted using the communication device 10. The remote system 21 may be implemented using one or more computing devices or computers, such as one or more server computers, and can be associated with or be operated by a service provider such as an issuer, payment processor, and/or other suitable entities. The remote system 21 may manage user accounts, provide verification and validation functions for transactions, manage lifecycle messages from issuer/host system, as well as initiate lifecycle management events.

To ensure that the transactions are processed appropriately, several core functions are implemented in the remote system 21 (not shown) to manage the deployment and usage of the account parameters. These functions may include provisioning, active account management, verification for payment, transaction processing, lifecycle management, and post-payment processing.

The remote system 21 may perform enrollment functions to enroll a mobile cardholder, and a set of provisioning functions that facilitates the preparation and delivery of account parameters. The remote system 21 may perform account parameters replenishment functions to facilitate the account parameter replenishment process for the provision on communication device, and account management functions that manage the replenishment.

The processing unit 18a may comprise a provisioning service 22 configured to facilitate communications between the mobile application 18 executing on the communication device 10 and other entities in the remote system 21. The provisioning service 22 may communicate with the remote system 21 via a communications network such as the Internet.

In some embodiments, the provisioning service 22 may implement authentication and signature functionalities to authenticate the user and/or the communication device 10 when the communication device 10 communicates with the other entities of the remote system 21. The authentication functionalities may ensure that a user and/or a communication device communicating with the system is an authorized one.

The provisioning service 22 may comprises a set of provisioning functions that facilitates the management of account parameters. The provisioning service 22 may comprise account parameters replenishment functions to facilitate the account parameter replenishment process from the remote system 21 on the communication device 10.

The provisioning service 22 in charge of establishment and maintaining a secure communication channel with the remote system 21 may be triggered by the remote system 21.

Figure 3:
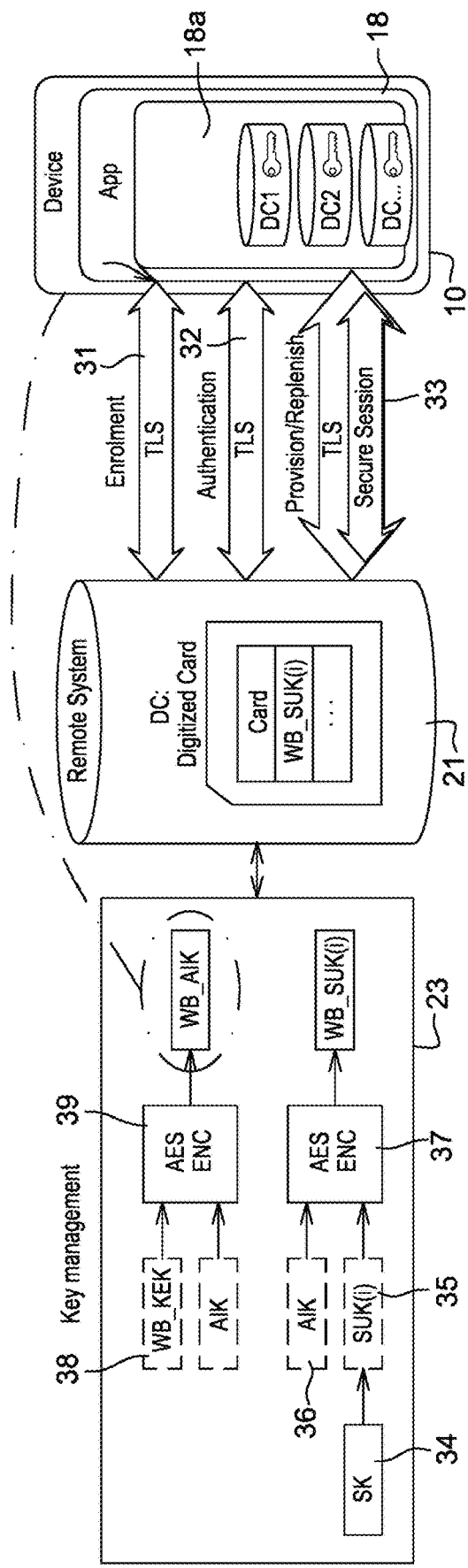
FIG. 3 is a logic flow diagram in accordance with an exemplary embodiment of the invention during a provisioning phase of the session key by a remote system to the communication device.

FIG. 3 illustrates a diagram flow 30 of the provisioning of account parameters for the initial setup of the mobile application 18 on the communication device 10.

The enrollment and provisioning process can be initiated from the mobile application 18 installed in the communication device 10. The mobile application 18 may be pre-installed on communication device during manufacturing or by a retailer, or by a user downloading the mobile application from an application store or from an issuer or a service provider and installing the mobile application 18 on the communication device 10.

The user may launch the mobile application and initiate an enrollment request 31 from the mobile application 18 to add an account to the remote system 21. Enrollment request 31 is sent from communication device 10 to the remote system 21 and may include information that can be used to identify the user and the account of the user, as well as device information about communication device.

During enrollment of the user of the communication device 10 to the remote system 21, a provisioning service of the remote system 21 may create account parameters such as an identifier to identify the enrolled account. Account parameters (may also be referred to as "account credentials") are information relating to an account (e.g., a financial account, bank account, payment account, etc.) associated with a user that can be used to conduct transactions on the user's account. The account parameters can be provided or provisioned to the communication device 10 to enable the communication device 10 to conduct transactions on the user's account (for example, by placing the communication device in proximity to a contactless reader of an access device 27 such as a point-of-sale (POS) terminal).

Account parameters may comprise an identifier that can be used to identify an account associated with the user (e.g., an account identifier such as a primary account number (PAN), an alternate account identifier such as an alternate PAN, or a token that is a substitute for an account identifier, etc.), an expiry date, and/or other account details or data that does not necessarily change for an extended period of time, or in some embodiments, for the lifetime of the account.

The account parameter may comprise one or more encrypted obfuscated session cryptography keys which may be associated with a limited lifespan and are repeatedly refreshed or replenished when they have exhausted their limited usage during the lifetime of an account. The limited lifespan may be a limited time or a limited number of transactions.

When the remote system 21 receives an enrollment request 31 from the mobile communication 10, the remote system 21 may perform identification, authentication and verification of the user and the user's account, at step 32. The remote system may send, at step 33, a provisioning request to a key management server 23 to generate the keys. The key management server 23 may be maintained in a secure location and operates as a centralized offline facility for managing the overall key management system. In an embodiment, the key management server 23 may comprise a key management system's hardware security module (HSM). The key management server 23 can be maintained or managed by an entity of the remote system 21 such as the issuer/host system server or the service provider.

Upon receiving provisioning request 33, the key management server 23 may use a master derivation key (MDK) associated to the mobile application 18 to generate the initial set of account parameters for provisioning to the communication device 10. The key management server 23 may generate, at step 34, the session cryptographic key. The session cryptographic key is used to generate a cryptogram. There are several existing different algorithms in use for generating a session cryptographic key from a master key.

In some embodiments, the master derivation key MDK can pre-generate a lifetime number of session cryptographic keys to be provide to the communication device 10. In other embodiments, a number of session cryptographic keys corresponding to the number of possible values of a transaction counter may be pre-generated. The transaction counter may be the EMV-defined Application Transaction Counter (ATC). In still other embodiments, a limited number of session cryptographic keys may be pre-generated, and additional session cryptographic keys may be provided to the communication device at a later time.

In an embodiment, the session cryptographic key is associated with a key index. The key index may include information pertaining to the generation of the session cryptographic key. For example, the key index may be used as a seed to generate its corresponding session cryptographic key. The key index may include time information (e.g., a timestamp) indicating when the session cryptographic key is generated, and/or may include a replenishment counter value indicating the number of times that the session cryptographic key has been renewed or replenished for a particular account, mobile application, or communication device. In some embodiments, the replenishment counter value may indicate the number of times the session cryptographic key has been replenished within a predetermined time period, and the replenishment counter value may reset when each predetermined time period elapses. In some embodiments, the session cryptographic key may include an application transaction counter value indicating the number of transactions that has been previously conducted by the mobile application 18 of the communication device 10 at the time the session cryptographic key is generated or may include a pseudo random number generated by a service provider or by a suitable entity such as an issuer involved in processing the transaction. It should be understood that the key index may include one or more pieces of information pertaining to the generation of the session cryptographic key, and that one or more or all pieces of information included in the key index may be used as a seed to generate the session cryptographic key.

In an embodiment, the generated session cryptographic key may be associated with a set of one or more limited-use thresholds that limits the usage of the session cryptographic key, where once the usage of the session cryptographic key has exhausted or exceeded the set of one or more limited-use thresholds, a further transaction conducted using that session cryptographic key will be declined even if the underlying account is still in good standing. The set of one or more limited-use thresholds to enforce can be determined, for example, by an issuer of the account or by a service provider that provides the transaction service.

The set of one or more limited-use thresholds may include at least one of a time-to-live indicating the duration of time for which the session cryptographic key is valid, a predetermined number of transactions for which the session cryptographic key is valid, and/or a cumulative transaction amount indicating the total transaction amount summed across one or more transactions for which the session cryptographic key is valid, or any combination thereof.

For example, a session cryptographic key may be valid for a time-to-live of five days, and a transaction conducted using that session cryptographic key after five days have elapsed since the session cryptographic key was generated may be declined. As another example, a session cryptographic key may be valid for a predetermined number of five transactions, and a sixth transaction (and any subsequent transaction) conducted using that session cryptographic key may be declined. As a further example, a session cryptographic key may be valid for a cumulative transaction amount of five hundred dollars, and a transaction conducted using the session cryptographic key after that session cryptographic key has already been used for transactions totaling more than five hundred dollars may be declined.

It should be understood that the limited usage values described above are just examples, and that other usage limits can be used. It should also be noted that in some embodiments, the number of transactions limited-use threshold can be set to one transaction such as each session cryptographic key is valid for only one transaction.

In an embodiment, after the transaction, the communication device 10 may delete the session cryptographic key using a protocol that renders the session cryptographic key unable to be recovered from the communication device 10. For example, the session cryptographic key may be erased using well-known secure data erasure techniques in which pseudorandom data is repeatedly overwritten onto to the physical memory location at which the session cryptographic key was stored.

In the present invention, to protect the session cryptographic key for unauthorized use/access, the key management server 23 may define a specific context to be bound to the session cryptographic key. The specific context is defined with at least one preventing data for unauthorized use and/or access of the session cryptographic key so that any change in the specific context will corrupt the session cryptographic key during unbinding phase.

In an embodiment, the key management server 23 may apply an obfuscation process to the generated session cryptographic key, in step 35, in a reversible way. The key management server 23 generates the obfuscated session cryptographic key. The session cryptographic key can be retrieved, by de-obfuscating the obfuscated session cryptographic key, only onto the controlling unit 18b of the mobile application 18 and during a computation of the transaction cryptogram. The session cryptographic key is obfuscated with preventing data for unauthorized use/access to said session cryptographic key. The data related to unauthorized use/access of the session cryptographic key may correspond to binding data related to at least the user, the mobile application, the communication device, the limited-use thresholds and/or any others predefined data.

In an embodiment, the obfuscation algorithm is a derivation algorithm. In an embodiment, the obfuscation algorithm is a reversible operation. In one embodiment, the reversible operation is a XOR operation. The obfuscation algorithm is not described herein. Of course, these examples of obfuscation of the session cryptographic key are merely examples, any reversible obfuscation algorithm can be used to generate the obfuscated session cryptographic key from the session cryptographic key and at least one preventing data for unauthorized use/access of the session cryptographic key.

Some embodiments of preventing data for unauthorized use/access of the session cryptographic key are described hereinafter. The preventing data for unauthorized use/access of the session cryptographic key may be related to:

- the user. In this case the session cryptographic key can be used only by him/her. The user preventing data can be a PIN, a fingerprint or any other biometric information, identifier, or any data related to the user.
- the Application. In this case the session cryptographic key can be used only on a specific application. The application preventing data can be an application ID, a signature of a certificate used to sign the application, an integrity indicator such as a hash or a checksum of a specific part of the application, etc. . . .
- the communication device. In this case the session cryptographic key can be used only in a predefined device for payment. The communication device preventing data can be a specific and unique characteristic of the communication device such as a unique ID, CPU ID, sensors list, etc. . . .
- the limited-use thresholds (sequence/history/life cycle of the keys). In this case the session cryptographic key can be used only in a pre-determined instant of time and sequence. The limited-use thresholds preventing data can be a sequence counter, a time stamp, key material extracted from previous keys, etc. . . .

Others preventing data can be used like geographic data, date, time, user location, etc. . . .

In the implementation described herein after, the session cryptographic key is bound with data related to the user and data related to a sequence counter ATC linked to the transaction. The preventing data for unauthorized use/access of the session cryptographic key may be a PIN and the sequence counter ATC. Therefore, the key session cryptographic key may be obfuscated with the PIN and the sequence counter ATC to generate a single key SUK corresponding hereinafter to the obfuscated session cryptographic key:

SUK=F(session cryptographic key,PIN,ATC)

The key management system 23 may generate, at step 36, a transport key AIK.

In step 37, the single key SUK is encrypted with the transport key AIK to generate an encrypted obfuscated key WB_SUK. In an embodiment, this encrypted obfuscated key WB_SUK may be an encryption AES128 of the single key SUK with the transport key AIK.

In step 38, a static key WB_KEK may be derived from a master derivation key (MDK) associated with the key management server 23. This static key WB_KEK is associated with a diversifier ID. The diversifier ID may include information pertaining to the generation of the static key WB_KEK. For example, the diversifier ID may be used as a seed to generate its corresponding WB_KEK.

The key management server 23 may encrypt, in step 39, the transport key AIK with the static key WB_KEK to generate a key WB_AIK. In an embodiment, this key WB_AIK is an encryption AES128 of the transport key AIK with the static key WB_KEK.

In an embodiment, the master derivation key (MDK) used by the key management system 23 to derivate the static key WB_KEK may be stored into the controlling unit 18b of the mobile application 18. In an embodiment, the master derivation key (MDK) may be stored as "hard-coded" text into the controlling unit 18b. The static key WB_KEK may be stored as "hard-coded" text into the secure module 29 of the controlling unit 18. In this case, the diversifier ID may be sent by the key management 23 to the remote server 21. The remote server 21 can forward it to the controlling unit 18b, during enrollment phase, to derivate the static key WB_KEK from the master derivation key (MDK). This derived static key WB_KEK can be stored in a secure memory of the emulated ICC card, but also can be stored elsewhere.

In an embodiment, the remote system 21 may store the diversifier ID on its side. And during a transaction, the mobile application 18 may request the diversifier ID to the remote system 21 to generate the static key WB_KEK. In an embodiment, this generated static key WB_KEK is deleted after the computation of the cryptogram.

In an embodiment, the static key WB_KEK is sent to the issuer of the mobile application 18. During compilation time, the static key WB_KEK may be stored as "hard-coded" text into the controlling unit 18b. In an embodiment, this static key WB_KEK can be stored in a secure memory of the emulated ICC card, but also can be stored elsewhere.

The key management system 23 then packages provisioning data, which may include an alternate account identifier or a token, an initial set of account parameters such as the encrypted obfuscated key WB_SUK, the encrypted transport key WB_AIK and other information relevant for executing and/or processing of a transaction (e.g., set of one or more limited-use thresholds associated with the WB_SUK), and sends provisioning data to the remote system 21 which forwards it to the communication device 10 through preferably a secure communication. The provisioning data may be stored into a secure memory of the emulated ICC card or in any other memory in the communication device 10.

The communication device 10 then stores the account parameters and relevant information on the communication device 10 to enable the communication device to be used for conducting transactions on the user's account.

Once provisioning data has been successfully provisioned onto the communication device 10, the communication device 10 may send an acknowledgement or confirmation to the remote system 21 to complete the enrollment and provisioning process.

After, the provisioning step 33 is completed, the remote system 21 may perform an active account management to initiate the renewal or replenishment of the account parameters. The active account management processes can be triggered by transaction processing activity or initiated by the mobile application 18 running on the communication device 10. If the service profile parameters for a particular account indicate that the account parameters on the device should be replaced (e.g., have exhausted their usage limits), the active account management capability recognizes this and attempts to connect to the communication device to replenish the account parameters. Additionally or alternatively, the mobile application can request account parameter replenishment when it detects that the account parameter replenishment is needed or is close to be being needed. The limited-use thresholds can be used to manage the triggers for refreshing or replenishing account parameters on a provisioned communication device.

To enhance the security, the encrypted transport key WB_AIK is associated with at least one limited-use thresholds that limits the usage of the transport key AIK, where once the usage of the transport key AIK has exhausted or exceeded the limited-use thresholds, a further transaction conducted using that transport key AIK will be declined. The limited-use thresholds to enforce can be determined, for example, by an issuer of the account or by a service provider that provides the transaction service.

Associating the transport key AIK with at least one limited-use thresholds may be necessary because a system that uses the same transport key AIK over a long period of time can be compromised as follows. A person wanting to decipher encrypted message data, hereafter known as an eavesdropper or unauthorized user, can monitor over the air transmissions and eventually discern the transport key AIK, and thus start compromising the system's security. To prevent the transport key AIK from being discovered by the eavesdropper, it must be changed often. Accordingly, the transport key AIK may be automatically updated (replenishment phase) based on the associated limited-use thresholds.

The account parameters and the service profile details (e.g., limited-use thresholds) can be provided to a digitized card manager 24 of the processing unit 18a of the mobile application 18 to ensure that the account parameters are managed appropriately on the communication device 10. The digitalized card manager 24 comprises a set of functionalities to manage account parameters for transactions conducted using the communication device 10.

It should be understood that the enrollment and provisioning process described above is just an example, and that the messaging sequence in some embodiments may have different variations.

The processing unit 18a may comprise a Card Holder Code Verifier 25. This Card Holder Code Verifier 25 provides the means to manage in a secure way user inputs in the format of digits. It can be used to manage PIN and activation code inputs.

The processing unit 18a may comprise a payment service 26. This component may comprise:
- an interface for the mobile application 18 to allow the user to retrieve information on the card provisioned (state of activation, card details). This information is retrieved from the digitized card manager 24.
- an interface to allow the mobile application 18 to communicate with an access device terminal 27 through contact or contactless (Bluetooth, NFC) communication.
- an interface to access to a payment engine 28 of the controlling unit 18b of the mobile application 18.

The payment engine 28 may be a component completely implemented in a native code C++ or C that may implement VISA and/or MasterCard payment flows. The payment engine 28 may use the security module 29, herein after the white box cryptography, to retrieve the session cryptographic key from the encrypted obfuscated key WB_SUK during a computation of the cryptogram and to compute the cryptogram from the retrieved session cryptographic key requested for the payment transactions.

Figure 4:
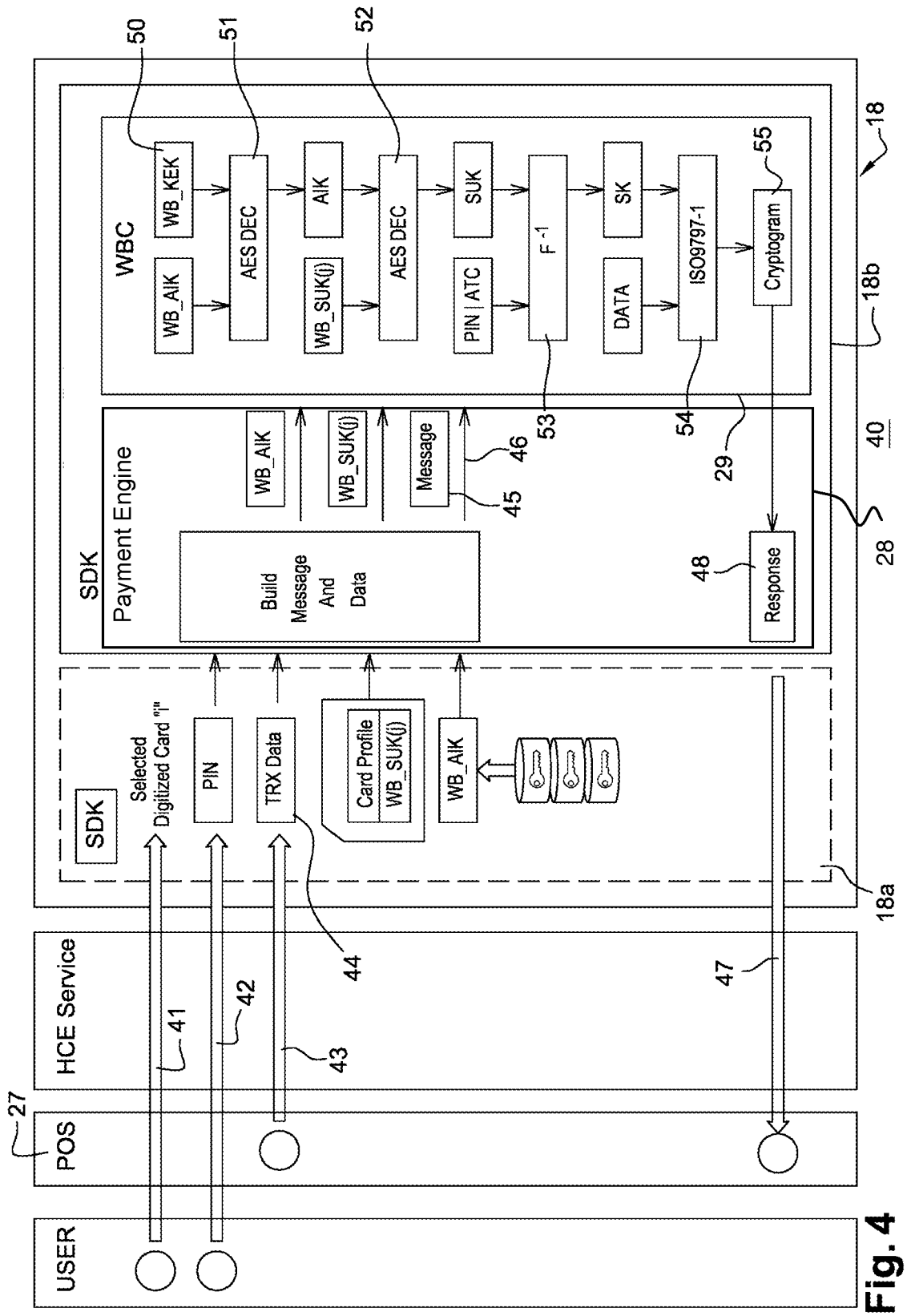
FIG. 4 is a logic flow diagram in accordance with an exemplary embodiment of this invention during the computation of a cryptogram.

FIG. 4 illustrates an example communication flow 40 between a communication device 10 and an access device 27 during a transaction, according to some embodiments. In some embodiments, the communications can be in the form of ADPU commands and responses. However, it should be understood that other messages, messaging protocols, or formats can be used to exchange the relevant information to conduct the transaction.

Once the communication device 10 has been provisioned with the appropriate account parameters, the communication device can be used to execute a transaction.

During a purchase, the communication device 10 exchanges a plurality of messages with the access device 27 such as a Point-Of-Sale (POS) terminal. The communication device 10 and the POS terminal negotiate whether the transaction will be performed, and if so, how it will be performed. Information received by the POS terminal may be used to verify the transaction with the remote system 21.

In the embodiment illustrated the executed transaction is by contactless, for example, by placing the communication device in proximity to a contactless reader of the access device 27.

During the transaction, the mobile application 18 may receive, store, and/or dynamically build information such as transaction flow parameters related to the contactless transaction in order to return the necessary information to the contactless reader for the transaction to be successfully executed.

Some of the transaction flow parameters may be received, stored, and/or built before the contactless transaction is initiated, while some transaction flow parameters (e.g., transaction cryptogram) can be dynamically built at the time of transaction.

In step 41, when the access device 27 detects the presence of the communication device 10 in proximity to a contactless reader of the access device 27, the access device 27 may initiate a transaction by sending a request of information to the communication device 10 to identify the digitized payment card to use. In an embodiment, the appropriate digitized payment card is determined based on the purchase context. For example, the mobile application 18 may receive information from the access device 27 that identifies the type of payment transaction as a gasoline purchase, a mass transportation ticket purchase, a department store purchase, and other. In an embodiment, the mobile application 18 may be launched automatically, for example triggered by the detection of a NFC emission from the access device 27. Alternatively the mobile application 10 may be launched by a variety of other methods The user of the communication device 10 is prompted to select a digitized payment card or use a default digitized payment card. If the user chooses to select a digitized payment card, the user may select a digitized payment card from a list of payment cards displayed in a dialog box.

In step 42, if the mobile application 18 is not configured to remember a PIN that protects access to the services and functionality of the mobile application 18, the user is requested to enter his PIN.

In step 43, when the verification of the PIN is successful, the mobile application 18 of the communication device 10 may send a terminal transaction data request to request transaction data from the access device 27 which may be needed to execute the transaction. In some embodiments, the terminal transaction data request may include a list of transaction data identifiers to request the appropriate data from the access device 27, and the list of transaction data identifiers can be in the form of a processing options data object list (PDOL). The transaction data requested by the mobile application for the transaction may include terminal transaction qualifiers (TTQ), authorized amount, other amount, terminal country code, terminal verification results, transaction currency code, transaction data, transaction type, and/or an unpredictable number.

After receiving the terminal transaction data request, the access device 27 may send, to the mobile application 18 of the communication device 10, said terminal transaction data 44 requested by the mobile application 18.

In step 45, once the mobile application of the communication device 10 receives the terminal transaction data 44, the mobile application may:
increment its Application Transaction Counter (ATC),
extract from storage the obfuscated encrypted key WB_SUK and the encrypted transport key WB_AIK and
build a message 45 comprising the transaction data 44, the ATC, the PIN, extracted key.

In step 46, the processing unit 18a may send the built message 45 to the controlling unit 18b. The controlling unit 18b generates dynamic transaction processing information using at least some of the received terminal transaction data 44, and send at step 47, a set of transaction processing information 48 including the generated dynamic transaction processing information to the access device 27.

The transaction processing information 48 may include a transaction cryptogram 55 dynamically generated by the controlling unit 18b by using the session cryptographic key.

During computation of the cryptogram, the payment engine 28, through the security module 29, retrieve the session cryptographic key. In step 50, the security module 29 may extract the stored static key WB_KEK or derivate it from an extracted master derivation key (MDK) and a received diversifier ID. In step 51, the security module 29 may decrypt the encrypted transport WB_AIK with the static key WB_KEK to retrieve the transport key AIK. In an embodiment, this decrypted transport key AIK may be a decryption algorithm AES128 of the encrypted transport key WB_AIK with the static key WB_KEK.

In step 52, the security module 29 may decrypt the received encrypted obfuscated key WB_SUK with the decrypted transport key to retrieve the obfuscated key SUK. In an embodiment, this decrypted obfuscated key SUK may be a decryption algorithm AES128 of the encrypted obfuscated key WB_SUK with the decrypted transport key AIK.

In step 53, the security module 29 may apply a de-obfuscation function ($F^{-1}$) to the decrypted obfuscated key SUK with the received ATC and the user input (PIN) to retrieve the session cryptographic key.

The payment engine 28, through the security module 29, computes the transaction cryptogram 55 with the retrieved key session cryptographic key, in step 64. The cryptogram can be understood as a signature on transaction data. The controlling unit 18b generates the cryptogram by encoding the transaction data with the session cryptographic key using for example a hash function that takes the transaction data and the cryptographic key as inputs and generates the cryptogram as an output. The hash function used to generate the cryptogram is a one-way mathematical function. That is, the session cryptographic key and the transaction data cannot be recovered from the cryptogram. Also, the cryptogram is unique to the particular transaction data and the session cryptographic key that are used.

It should be understood that in some embodiments, the transaction processing information 48 being sent from the communication device 10 to the access device 27 may include some or all of the information describe above, and in some embodiments, may include additional information not specifically described.

After the access device 27 has received the requisite data from the transaction processing information 48, some or all of the data elements in the transaction processing information 48 can be used by the access device 27 to generate a transaction authorization request message to request authorization of the transaction from the issuer. For example, in some embodiments, the transaction authorization request message may include at least the track-2 equivalent data and the transaction cryptogram generated with the session cryptographic key. The transaction authorization request is sent by the access device 27 to the remote system 21 for verification and validation.

Thus, assuming the remote system 21 knows the session cryptographic key used by the controlling unit 18b, once the remote system 21 has been provided the transaction data by the access device 27, the remote system 21 can generate a cryptogram from the transaction data using its known cryptographic key and comparing it to the cryptogram that was generated by the controlling unit 18b.

If at least one binding data is wrong, the session cryptographic key couldn't be retrieve and the cryptogram is wrongly computed. The remote system 21 rejects the transaction. The user can be notified of the failure. The user device can be blacklisted of performing transaction.

With the present invention, instead of using pure Boolean flags to trigger an action when the retrieved session cryptographic key does not correspond to the expected key session cryptographic key, it is proposed to compromise the computation of the cryptogram in the aim to fail the transaction from a third party side.

In an embodiment, the mobile application 18 may be a merchant's own mobile application from which consumers can conduct e-commerce or point of sale transactions with that merchant, or may be a mobile wallet.

In an embodiment, the cryptogram is sent to the access device 27 or the remote system with an index indicating the type of preventing data used to obfuscate the session cryptographic. If the verification of the computed cryptogram failed, the remote system 21 can apply a risk of management policy according to the received index of the preventing data. In an embodiment, the remote system 21 can alert the user, informing him that his user device is compromised and should be denied authorization or otherwise banned from performing transactions. User can be worn by the remote system by a SMS message. However, the subject matter herein is not limited to the example in which users are notified of unsuccessful transaction and/or the threat through the remote system. Users may be notified in any manner.

Embodiments of the present invention can be performed by a communication device with or without a secure element. Embodiments of the present invention provide techniques for enhancing the security of a communication device when conducting a transaction using the communication device without involving a secure element. The techniques described herein can be used with a communication device that may or may not have a secure element, because the techniques do not require the use of a secure element, but the secure element could be present.

The features and functions of the implementations illustrated by the figures can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention.

The invention claimed is:

1. A method for enhancing security of a communication device when conducting a transaction, defined by transaction data, using a transaction application of the communication device by receiving transaction session keys from a key management server via a remote server, the method comprising:
   generating, by the key management server, account parameters included in a provisioning package by:
      generating, using a reversible function, a bound session cryptographic key by binding a session cryptographic key to a specific context defined as at least a first binding preventing data related to the transaction wherein said binding of said session cryptographic key to said first binding preventing data prevents unauthorized use or access of the session cryptographic key as any deviation from the specific context used to generate the bound session cryptographic key corrupts the session cryptographic key during a subsequent unbinding phase;
      generating a transport key;
      encrypting the bound session cryptographic key with the transport key;
      encrypting the transport key with a static key stored on the communication device or retrievable by the communication device;
      incorporating the encrypted bound session cryptographic key and the encrypted transport key into the provisioning package;
   transmitting, by the key management server, the provisioning package to the remote system;
   transmitting, by the remote system, the provisioning package to the communication device,
   computing a transaction cryptogram, by the communication device, wherein the step of computing a transaction cryptogram comprises:
      receiving the provisioning package from the remote server;
      retrieving the static key;
      recovering the transport key by decrypting the encrypted transport key received in the provisioning package using the static key;
      recovering the bound session cryptographic key received in the provisioning package using the recovered transport key;
      determining first unbinding preventing data; and
      unbinding the session cryptographic key from the specific context using the determined first unbinding preventing data using an inverse function of the reversible function, whereby a determined unbinding preventing data not equal to the binding preventing data results in a corrupted unbound session cryptographic key whereas a determined preventing data equal to the binding preventing data results in an unbound session cryptographic key that is not corrupted;
      computing the transaction cryptogram using a one-way cryptographic hash function to the transaction data using the unbound session cryptographic key, wherein the transaction is authorized or rejected based on whether the computed transaction cryptogram is an expected transaction cryptogram or a not expected transaction cryptogram.

2. The method according to previous claim 1, wherein the binding of the session cryptographic key to a specific context of the session cryptographic key comprises obfuscating the session cryptographic key with said binding preventing data for unauthorized use or access of the session cryptographic key.

3. The method according to claim 1, further comprising:
   deriving, by the key management server, the static key from a master key and a diversifier ID;
   wherein the master key is stored by the communication device; and
   retrieving, by the communication device, the static key comprises deriving the static key from the master key and the diversifier ID, and decrypting, by the communication device, the encrypted transport key using the retrieved static key; and
   deleting, by the communication device, the static key after computation of the transaction cryptogram.

4. The method according to claim 1, wherein retrieving of the static key comprises the following step:
   extracting, by the communication device, the static key stored as hard coded text in the transaction application code or stored in a secure memory.

5. The method according to claim 1, wherein the session cryptographic key is associated with a set of one or more limited-use thresholds that limit usage of the session cryptographic key.

6. The method according to claim 5, wherein the set of one or more limited-use thresholds may include at least one of a time-to-live threshold indicating the duration of time for which the session cryptographic key is valid, a predetermined number of transactions for which the session cryptographic key is valid, and/or a cumulative transaction amount indicating the total transaction amount summed across one or more transactions for which the session cryptographic key is valid.

7. The method according to claim 1, wherein after the computation of the transaction cryptogram, deleting, by the communication device, the session cryptographic key.

8. A communication device comprising:
   a processor; and
   a memory coupled to the processor and storing a transaction application that includes instruction to cause the processor to perform operations for enhancing security of the communication device when conducting transactions, defined by transaction data, using the communication device including instructions to cause the processor to:
receive from a key management server a provisioning package including a bound session key generated by the key management server and encrypted with a transport key, said bound session key being bound, using a reversible function, to a specific context defined with a binding preventing data, the first binding preventing data related to a transaction wherein said binding of said session cryptographic key to said binding preventing data prevents unauthorized use and/or access of an unbound session cryptographic key so that any change in the specific context corrupts the unbound session cryptographic key during a subsequent unbinding phase, the provisioning package further including an encrypted transport key, wherein the encrypted transport key is an encryption of the transport key using a static key;
during computation of a transaction cryptogram corresponding to the transaction, to:
retrieve the static key;
recover the transport key by decrypting the encrypted transport key received in the provisioning package using the static key;
recover the bound session cryptographic key received in the provisioning package using the recovered transport key;
determine the unbinding preventing data and to unbind the bound session cryptographic key from the specific context using the determined unbinding preventing data using an inverse function of the reversible function, whereby a determined unbinding preventing data not equal to the binding preventing data results in a corrupted unbound session cryptographic key whereas a determined preventing data equal to the binding preventing data results in an unbound session cryptographic key that is not corrupted; and
compute the transaction cryptogram using a one-way cryptographic hash function to the transaction data using the unbound session cryptographic key, wherein the transaction is authorized or rejected based on whether the computed transaction cryptogram is an expected transaction cryptogram or a not expected transaction cryptogram.

9. A non-transitory memory storing a transaction application for enhancing security of a communication device having at least one processor and one or more memories storing instructions that executable by the at least one processor, when conducting a transaction, defined by transaction data, using the communication device,
the transaction application comprising instructions for causing the processor of the communication device to perform the transaction, the transaction application having a processing unit, the processing unit comprising:
a provisioning service configured to establish a communication with a remote system during a provisioning or replenishment phase of a bound session cryptographic key received from a remote system, wherein the bound session cryptographic key being bound, using a reversible function, to a specific context defined with a binding preventing data related to a transaction wherein said binding of said session cryptographic key to said binding preventing data prevents unauthorized use and/or access of an unbound session cryptographic key so that any change in the specific context corrupts the unbound session cryptographic key during a subsequent unbinding phase, the bound session cryptographic key being encrypted with a transport key, and the transport key being encrypted with a static key;
the transaction application further comprising a controlling unit, the controlling unit comprising a security module;
the processing unit to transmit, to the security module of the controlling unit, the encrypted bound session cryptographic key bound to the specific context;
during computation of a transaction cryptogram, the security module of the transaction application comprising instructions to:
retrieve the static key;
recover the transport key by decrypting the encrypted transport key;
recover the bound session cryptographic key using the recovered transport key;
retrieve a unbinding preventing data and to unbind the bound session cryptographic key from the specific context with the retrieved unbinding preventing data using an inverse function of the reversible function;
compute a cryptogram using a one-way cryptographic hash function to the transaction data from the unbound session cryptographic key, wherein the transaction is authorized based on whether the computed transaction cryptogram is the expected one and the unbinding session cryptographic key is not corrupted.

10. The non-transitory memory storing a transaction application according to claim 9, wherein the security module is a white box cryptography or a Trusted Execution Environment.

11. The communication device according to claim 8, wherein the processing unit and the controlling unit are in the form of a software developer kit integrated into the transaction application.

12. The communication device according to claim 8, wherein the processing unit is implemented in platform independent code and the controlling unit is implemented in native code.

13. The non-transitory memory storing a transaction application according to claim 9, wherein the processing unit and the controlling unit are in the form of a software developer kit integrated into the transaction application.

14. The non-transitory memory storing a transaction application according to claim 9, wherein the processing unit is implemented in platform independent code and the controlling unit is implemented in native code.

15. The method according to claim 1, wherein said data related to the transaction is a transaction sequence counter.

16. The method according to claim 3, further comprising:
requesting, by the communication device, from the remote system, the diversifier ID.

17. The method according to claim 1, further comprising:
associating the transport key with at least one limited-use threshold.

18. The method according to claim 1, further comprising:
incorporating at least one limited-use threshold associated with the encrypted bound session cryptographic key into the provisioning package;
upon expiration of the at least one limited-use threshold associated with the encrypted bound session cryptographic key, declining transactions using a cryptogram generated using the session cryptographic key and replenishing the account parameters including the encrypted bound session cryptographic key.

19. The method according to claim 1, further comprising:
associating at least one limited-use threshold with the encrypted transport key; and
upon expiration of the at least one limited-use threshold associated with the encrypted transport key, declining transactions using the encrypted transport key.

20. The method according to claim 1, further comprising:
upon receiving an enrollment request from the communication device, operating the remote server to perform identification, authentication, and verification of a user of the communication device and an account of the user, and transmitting a provisioning request to the key management server to generate the bound session cryptographic key.

21. The method according to claim 1, wherein the session cryptographic key is further bound to a limited-use threshold and wherein the limited-use threshold is selected from a group consisting of a limited time, a limited number of transactions, a limited cumulative transaction amount.

22. The method according to claim 3, further comprising:
during a transaction that the remote server, by the communication device, to provide the diversifier ID.

23. The method according to claim 3, further comprising:
transmitting the diversifier ID from the key management server to the remote server; and
forwarding the diversifier ID from the remote server to the communication device.

24. The communications device of claim 8, wherein said data related to the transaction is a transaction sequence counter.

25. The non-transitory memory of claim 9, wherein said data related to the transaction is a transaction sequence counter.

* * * * *